Dec. 8, 1970 J. BRANY 3,545,139

METHOD AND APPARATUS FOR THE MANUFACTURE OF SPHERICAL BODIES

Filed Sept. 17, 1968 3 Sheets-Sheet 1

INVENTOR
Jaroslav Braný
BY
Richard Low[?] Agt

Dec. 8, 1970 J. BRANY 3,545,139

METHOD AND APPARATUS FOR THE MANUFACTURE OF SPHERICAL BODIES

Filed Sept. 17, 1968 3 Sheets-Sheet 2

INVENTOR
Jaroslav Braný
BY
Richard Lowe [?] Agt

METHOD AND APPARATUS FOR THE MANUFACTURE OF SPHERICAL BODIES

Filed Sept. 17, 1968 3 Sheets-Sheet 3

INVENTOR
Jaroslav Brany
BY
Richard Low, agt 3,545,139

METHOD AND APPARATUS FOR THE MANUFACTURE OF SPHERICAL BODIES

Jaroslav Brany, Prague, Czechoslovakia, assignor to Vyzkumny ustav strojirenske technologie a ekonomiky, Prague, Czechoslovakia Filed Sept. 17, 1968, Ser. No. 760,192
Int. Cl. B24b *1/00, 11/02*
U.S. Cl. 51—117 14 Claims

ABSTRACT OF THE DISCLOSURE

A spherical body is machined first along a system of meridians, the angular spacings of which are positively controlled, whereupon the body is turned and machined along another system of meridians whose poles are angularly spaced from the poles of the previously machined meridian system.

BACKGROUND OF THE INVENTION

Field of the invention

The present invention relates to a method and an apparatus for precision machining, grinding, flashing, lapping or similar treatment of spherical bodies, in particular balls for anti-friction bearings.

Description of the prior art

The great strides made by general engineering, the aircraft and motor car industry and in particular by precision engineering place ever increasing requirements on accuracy in the manufacture of antifriction bearings.

Spherical bodies, such as balls for antifriction bearings, are at present ground and lapped between working disks in such away that after each passage of the ball between said disks a spherical strip is machined. The accuracy of machining and consequently the sphericity of the surface is increased by increasing the number of passages of the ball between the disks and depends therefore on an accidental change in the position of the ball when starting a subsequent passage. It is a disadvantage inherent in these conventional processes that there occurs no such movement of the ball by which a positively controlled change in the position of the axis of rotation of the ball would take place, but that there occurs just an accidental change in the postiion of the axis of rotation, depending on the probability factor, so that the maintenance of an accurate geometrical shape is in no way ensured.

SUMMARY OF THE INVENTION

It is an object of the present invention to overcome the disadvantages set forth above.

It is another object of the invention to provide a method and an apparatus for the manufacture of spherical bodies which ensure a high degree of precision at relatively low production costs.

It is a further object of the invention to provide a method and an apparatus ensuring an increased performance while at the same time reducing the requirements on power supply and labor.

It is still another object of my invention to provide an apparatus of the aforementioned type which can easily be used in connection with the majority of the heretofore known machines for the manufacture of antifriction bearing balls.

A further object of the invention is the manufacture of balls machined with such a high degree of precision as to increase the useful lifetime of antifriction bearings in which they are mounted.

The method according to the present invention includes subjecting the spherical body to a rolling motion between two working surfaces at least one of which constitutes at the same time a control surface, the points of rolling between the spherical body and the working surfaces being positively and controllably displaced in relation to an axis perpendicular to the working surfaces so as to produce a system of meridians. When the required portion of the meridian system has been formed, the displacement of the rolling points is interrupted by a dwell which products a phase shift and determines the angular spacing of the pole to be formed after the dwell from the pole of the previously produced meridian system.

The apparatus of the invention for carrying out the aforesaid method comprises two working disks at least one of which is rotatable. One of the disks is equipped with a longitudinally profiled control surface, preferably in the form a groove, the profile having the shape of waves, preferably of sinusoidal formation. The waves constitute sequences which are separated from one another by dwells adapted to produce a phase shift which determines the angular spacing of consecutive poles.

In order that the terminology used in this specification be clearly understood, the following explanations are given:

A number of consecutive waves will be called a "sequence." A sequence of waves followed by a dwell will be termed a "complex." Two or more complexes constitute what will be termed a "polycomplex." A closed or complete working cycle contains at least one complex.

The term "meridian" as used throughout this specification denotes a half-circle circumscribed around the spherical body and reaching from one pole to the other. Together with a meridian at the opposite side of the spherical body it forms what will be called a "double meridian."

The waves by whose sequence the longitudinal profile of the control surface or groove is produced are shaped in such a way that their length is related to a full revolution of the spherical body of a given diameter around its axis of rotation, with the result that the transmission ratio is 1:1.

Alternatively, the waves by whose sequence the longitudinal profile of the control surface or groove is produced may also be shaped in such a way that their length is related to the integer of revolutions of the spherical body of a given diameter around its axis of rotation, with the result that the transmission ratio is $n$:1, $n$ being a real, positive, and whole or integer number.

Waves by whose sequence the longitudinal profile of the control surface or groove is produced may further be shaped in such a way that their lengths are different. The total length of waves constituting a sequence is related to an integer of revolutions of the spherical body of a given diameter around its axis of rotation, with the result that the transmission ratio of one complex or polycomplex is $n$:1.

By the new machining process, the ovalness or irregularity of spherical bodies is reduced to a minimum. Antifriction bearings equipped with balls produced according to the invention operate with substantially less noise than all the known bearings, have a longer life, and show a considerable increase in their dynamic carrying capacity. My new manufacturing process leads to a far higher productivity in the manufacture of balls than has been possible with the known techniques.

The invention, both as to its method and its apparatus, together with additional objects and advantages thereof, will best be understood from the following description of specific embodiments, when read in connection with the accompanying drawings in which:

Figure 7:
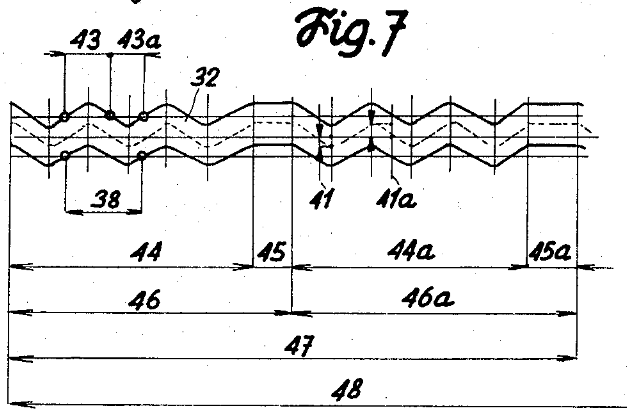
Figure 8:
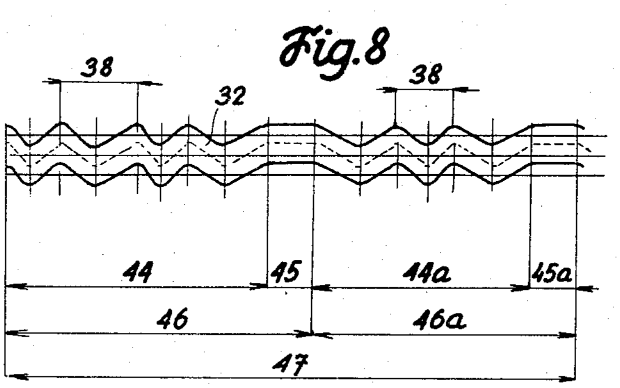
Figure 9:
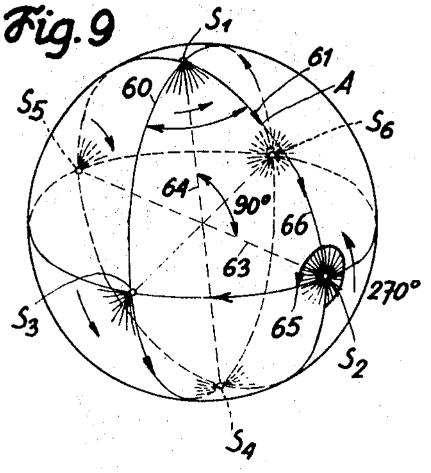
Figure 11:
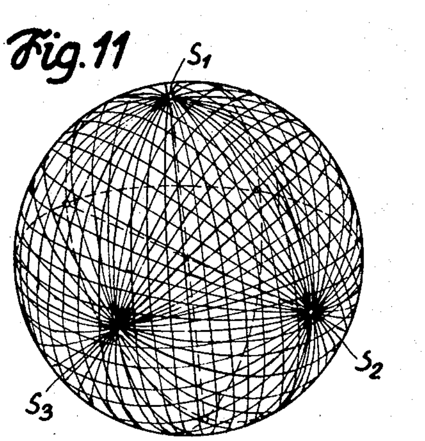
Figure 12:
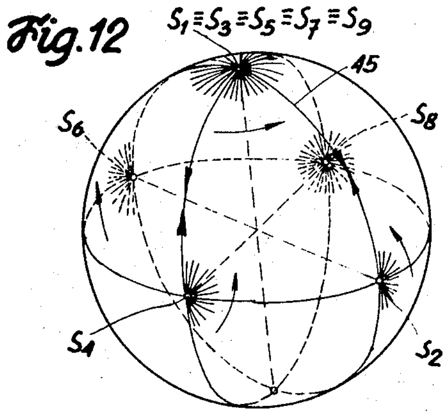

FIGS. *6a*, *6b*, *6c* represent diagrammatic sectional views showing the contact of the control groove with a spherical body in both extreme positions and in the central position;

FIG. 7 shows an exemplary embodiment of a developed control groove with regular wave formation;

FIG. 8 is a similar view of a developed control groove with irregular wave formation;

FIG. 9 represents a spherical body on which three double meridian systems have been formed by a threefold passage of the respective spherical body through a polycomplex;

FIGS. *10a* to *10f* represent the formation of a meridian system when viewed in the direction toward the "north poles" during the passage of the spherical body through the various complexes;

FIG. 11 represents the spherical body covered by a network of meridians which are formed after the spherical body has passed through the entire working cycle;

FIG. 12 shows a spherical body on which another type of three double meridian systems has been formed during a fourfold passage of the spherical body through a polycomplex; and FIGS. *13a* to *13h* show the formation of the meridian system, when viewed in the direction toward the "north pole" during passage of the spherical body through the various complexes.

DESCRIPTION OF PREFERRED EMBODIMENTS

Figure 1:
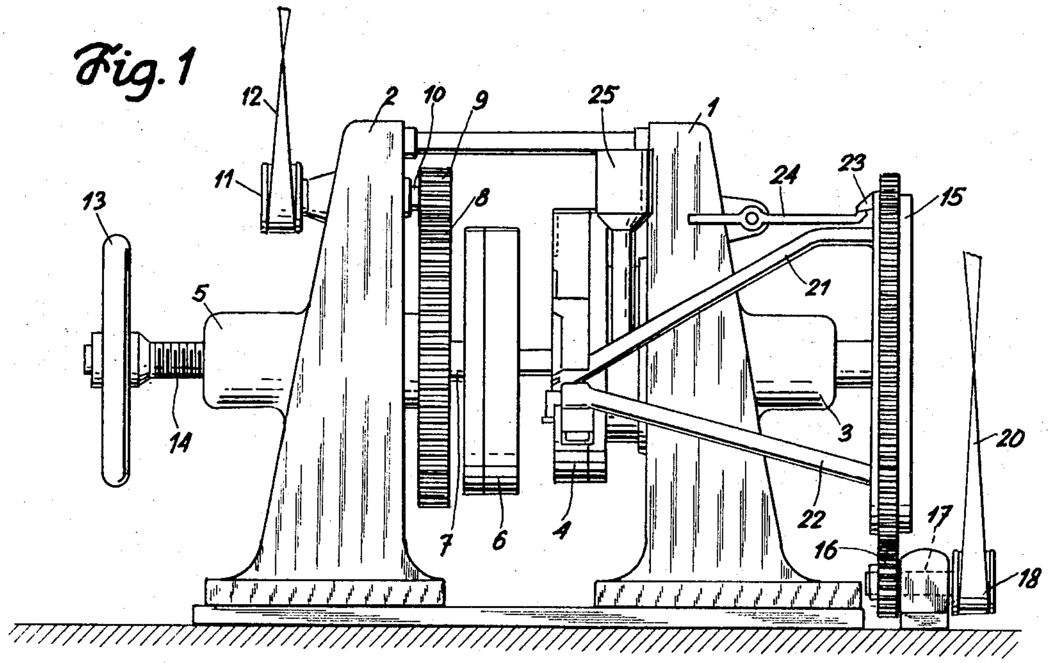
FIG. 1 is a diagrammatic elevational view of a machine for the manufacture of spherical bodies, in particular antifriction bearing balls, of a conventional design but embodying the apparatus according to the present invention.

FIG. 1 illustrates a conventional machine for the manufacture of antifriction bearing balls, which is equipped with the apparatus according to the present invention. The machine frame consists of two parts 1 and 2. Part 1 contains a bearing 3 which supports a first working disk 4 that may be either fixed or rotatable. Part 2 contains a bearing 5 that supports a second working disk 6 which in the illustrated example is mounted on a shaft 7 driven by a gear wheel 8. The latter meshes with a pinion 9 which is keyed onto a shaft 10. The latter carries a driving pulley 11 actuated by a belt 12 from a suitable source of power (not illustrated). The disk 6 is, in a known way, displaceable in axial direction by rotation of a handwheel 13 fixed to a screw spindle 14. Thus, the disk 6 may be moved toward or away from the disk 4.

Provided in the disk 4 is a groove adapted to receive the balls to be machined, as will be described in detail hereinafter. The balls are fed to the disk from a drum-type magazine 15 which comprises in its interior a plurality of radial partitions that form segment-shaped chambers housing the balls. This type of magazine is well known in the art and need not be described in detail.

The magazine 15 is rotated by means of a gear wheel 16 mounted on a shaft 17 which carries a pulley 18 driven by a belt 20 from a suitable source of power (not shown). Due to the rotation of the magazine 15, the balls in the various segment-shaped chambers are carried upwardly and enter in the top position of each chamber a supply tube 21 leading to the referred to groove in the disk 4. Having passed through the groove, the balls drop into a discharge tube 22 through which they proceed to one of the lower segment-shaped chambers in the magazine 15.

Upon further rotation of the magazine they are again carried upwardly to the tube 21 whereupon the entire cycle of operation is repeated.

The magazine 15 is provided with a claw catch 23 engaged by a lever 24. When the lever 24 is released from engagement with the catch 23 the magazine can be tilted, and the balls taken out.

Grinding, lapping or any other working material, such as emulsions, etc. may be fed to the working disks through a funnel 25 mounted on the frame part 1 of the machine.

It will be apparent to those skilled in the art that the working disks 4 and 6 which in the machine shown in FIG. 1 rotate in vertical planes may just as well revolve in horizontal planes. In the other illustrations, the disks are represented as horizontal disks in order to make it clear that the invention is applicable to disks assuming any required position.

The following disclosure relates first to the machining of a ball between two working disks 4 and 6 of a conventional type to show clearly new features of the present invention against the background of a conventional machining process.

A ball 30 when machined between conventional disks 4 and 6 (FIGS. 2 and 3) is pressed into a groove 31 in the rotatable disk 6, and into a groove 32 in the stationary disk 4, the groove 32 being a so-called "control" groove. When viewed in cross section, the ball 30 is in contact with the entire surface not only of the groove 31 but also of the control groove 32, so that a pair of rolling points 33, 34 is formed. In the rolling points 33, 34, the relative velocity between the ball 30 and the disks 4 and 6 equals zero. The rolling points 33, 34 assume such a position that the moments of frictional forces are simultaneously in equilibrium in relation to an axis 35 of the ball 30, which axis is parallel to an axis 36 of rotation of the disks 4 and 6. As for an axis 37 of rotation of the ball 30, the axis 37 is perpendicular to the axis of rotation 36 of the disks 4 and 6.

If this condition is fulfilled, then the axis of rotation 37 of the ball 30 always intersects the axis of rotation 36 of the disks 4 and 6, the angle $\alpha$ formed between the axis of rotation 37 of the ball 30 and the axis of rotation 36 remaining unchanged during the passage of the ball between the disks 4 and 6. This is why after one passage of the ball 30 through the working grooves 31, 32 in the disks 6 and 4, respectively, the ball is machined in such a way that the maximum removal of material takes place in a strip between the pair of rolling points 33, 34 and further in the marginal portions where the ball 30 contacts the disks 4 and 6 (see FIG. 3), while the surface in the vicinity of the rolling points 33, 34 and the spherical caps which during this passage have not come into contact with the disks 4 and 6, are not machined at all. After one passage, the ball is machined very irregularly, with some kind of steps produced on its surface. These irregularities are machined during further passages of the ball 30 between disks 4 and 6, provided the ball 30 assumes a position in which its axis of rotation 37 will differ from its previous position when starting the next passage.

The present invention aims at eliminating a haphazard machining process and at positively achieving a spherical surface while simultaneously shortening the duration of the machining operation. To this end it is necessary that an operative cycle be closed in the course of each passage of the ball, which means that its entire surface must positively come into contact with the working disks 4 and 6. This is achieved by causing the position of the axis of rotation 37 of the ball 30 to change so that the angle $\alpha$ enclosed by the axis of rotation 37 of the ball 30 and the axis of rotation 36 of the disks 4, 6 is variable.

Figure 2:
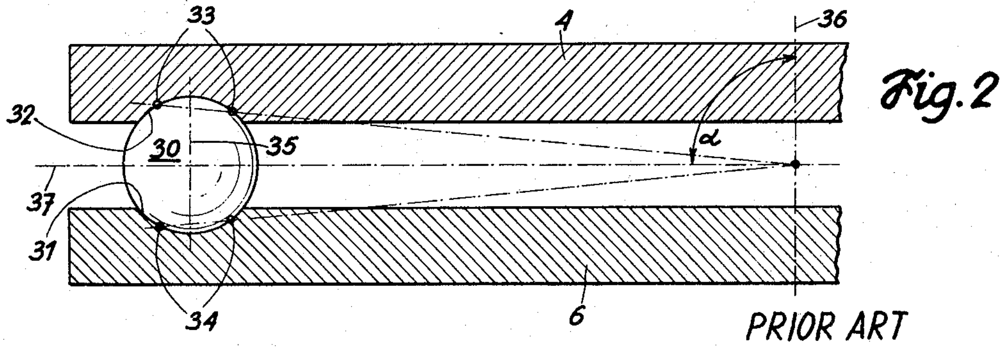
FIG. 2 is a diagrammatic cross sectional view in elevation, showing a known apparatus for the manufacture of antifriction bearing balls.
Figure 3:
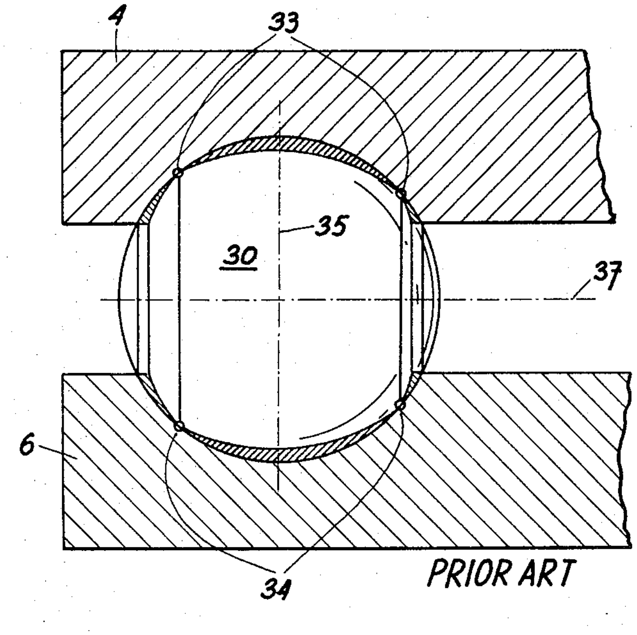
FIG. 3 shows, on a larger scale, a detailed view of a ball machined by a known process after one passage of the ball between working disks has been completed, the view indicating the portions where the maximum removal of material has taken place.
Figure 5:
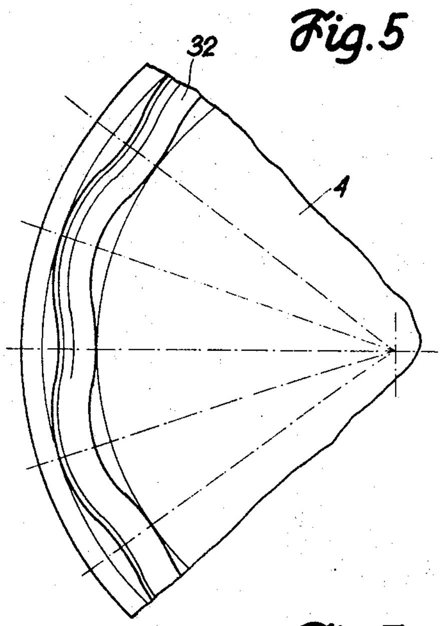
FIG. 5 is a view from below, showing the shape of a part of a control groove provided in a machining disk.
Figure 4:
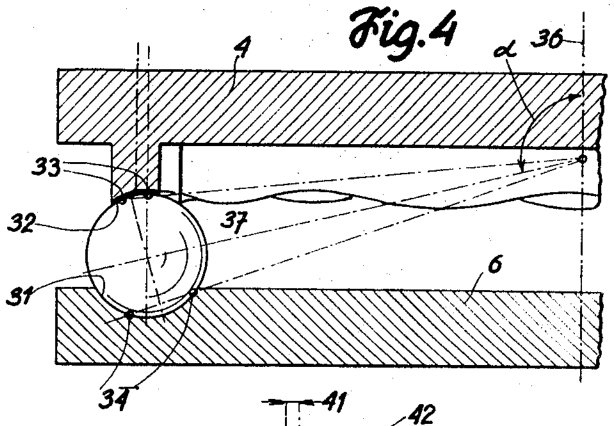
FIG. 4 is a cross-section in elevation through an apparatus for high precision machining according to the present invention.
Figure 6A:
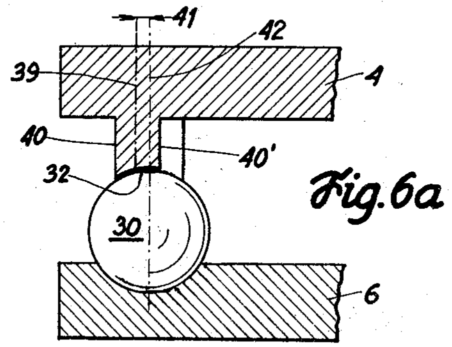
Figure 6B:
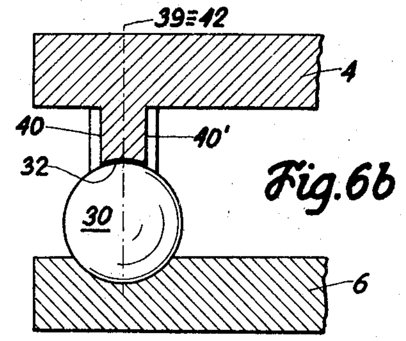
Figure 6C:
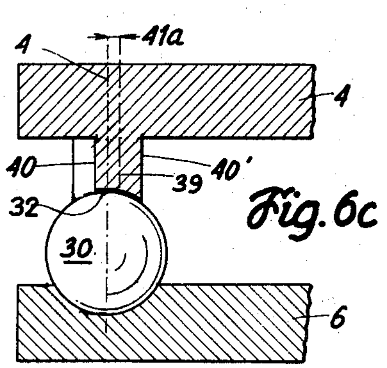

This feature is illustrated diagrammatically in FIGS. 4, 5 and 6 wherein, for the sake of clarity, the same reference numerals are used as in FIGS. 2 and 3. The change in position of the axis of rotation 37 is dependent on the longitudinal profile of the control groove 32 of the fixed disk 4 (see FIG. 5). The profile of this control groove 32 consists of a predetermined number of waves 38 (FIG. 7) whose shape is determined by the position of the extreme points of contact between the control groove and the ball 30. The significant positions assumed by the control groove 32 contacting the ball 30 are seen in FIG. 6*a* wherein the control groove 32 is shown in its extreme left-hand position, in FIG. 6*b* showing the control groove 32 in its central position, and in FIG. 6*c* wherein the control groove 32 is in its extreme right-hand position.

The center line 39 of the sidewalls 40, 40′ enclosing the control groove 32 (FIG. 6*a*), when in its extreme left-hand position, shows a maximum negative amplitude 41, determined by its distance from an axis 42, which is perpendicular to the planes of the disks 4 and 6 and will hereinafter be called "perpendicular axis 42".

The center line 39 of the control groove 32, when in its extreme right-hand position (FIG. 6*c*), shows a maximum positive amplitude **41*a* with regard to the perpendicular axis 42. When the ball 30 proceeds through the control groove 32, the contact face between the ball 30 and the control groove 32** changes in a manner illustrated in FIGS. 6*a* to 6*c*. Consequently, the rolling points 33 and 34 on the control groove 32 change and cause thereby a change in the position of the axis of rotation 37 of the ball 30. The change of the contact face may preferably proceed according to a sinusoid but, if required, may also proceed in jumps, and in the latter case the longitudinal profile of the control groove would be of a substantially zig-zag formation.

The formation of the developed control groove 32 is shown in FIG. 7. Each wave 38 comprises a positive portion 43 and a negative portion **43*a* of a period. The wave 38 causes a change in the position of the axis of rotation 37 of the ball 30 (FIG. 4) from one extreme position to the other. Two meridians are thereby produced on the ball 30 which performs one revolution. As already stated, the term "meridian" denotes half a circle described around the circumference of the ball and extending from one pole to the other. The total of waves 38 constitutes a wave system which will be called a "sequence" and is designated 44 in FIGS. 7 and 8. As a result of the passage of the ball 30 through the sequence 44, a meridian system or a part of such system is produced on the ball 30, comprising such number of meridians as there are periods 43, 43*a* in the sequence 44. Each sequence 44 is followed by a dwell 45 which corresponds to that part of the rolling movement of the ball 30 in which a phase shift occurs. The phase shift determines the position of the following meridian system which will be produced on the treated ball 30 as a result of its passage between the disks 4 and 6. In the embodiment shown in FIG. 7, the sequence 44 comprises waves 38 and periods 43, 43*a*** of equal length.

Having passed through one wave 38, the ball 30 has been rotated *n*-times. This will be referred to as a transmission ratio *n*:1, wherein *n* is a real, positive, and whole or integer number. If the transmission ratio *n*:1 is accurately maintained, the meridians will intersect one another in one theoretical pole. If the transmission ratio is not accurately maintained, a so-called pole cap will be produced.

The sequence 44 and the dwell 45 constitute what will be termed a "complex" 46. As soon as the ball 30 finishes its passage through the first complex 46, it starts its passage through a further sequence **44*a* of a second complex 46*a*. This results in the formation of a further meridian system, or of a part thereof, at another location on the ball 30, such location being determined by the passage of the ball through the preceding dwell 45. The next sequence 44*a* may differ from the preceding sequence 44 by the number and formation of waves 38. When the ball 30 passes through the next dwell 45*a*, the second complex 46*a* is terminated. There may be any required number of complexes 46 and 46*a*, their number being restricted only by given possibilities, such as the length of the path (total length of the groove) given by the size of the disk 4. The total of complexes 46, 46*a*, which may differ by the number as well as by the formation of the waves 38 or by the formation of dwells 45, 45*a*, constitutes what will be termed a "polycomplex" 47. After the ball 30 has passed through at least one polycomplex 47, the simplest operational cycle 48** is terminated.

Each sequence **44, 44*a* may comprise waves 38 differing in length and number, and each wave may contain periods 43, 43*a* having different lengths and amplitudes 41, 41*a*, which means that the two portions of a period 43, 43*a*** need not be equal. In this case the partial transmission ratio differs from the ratio *n*:1, and this means that by passage through each individual wave 38 the ball 30 will not revolve *n*-times but will revolve so many times that the number of its revolutions will not be an integer or whole number. However, the mean transmission ratio, after the ball 30 has passed through a sequence 44 of waves 38, must amount to, or at least approach, the ratio *n*:1 wherein *n* denotes again a real, positive, and whole or integer number indicating the number of revolutions of the ball 30 during its passage through one wave 38. An example of this embodiment is shown in FIG. 8 wherein the formation of a developed control groove 32 is illustrated. In this case the polycomplex 47 comprises two complexes **46, 46*a*, the first having four waves 38 and the second three waves 38. When passing through the first sequence 44 and through the second sequence 44*a*, the ball 30 performs a total of seven revolutions, but during its passage through each wave 38 another partial ratio is obtained. The meridians produced in this case do not intersect each other in a theoretical pole, but always two and two meridians will intersect in another pole, so that a so-called "multi-pole system" is created which, with a view to achieving a uniform machining of the ball, is still more advantageous than the one-pole system produced by the action of a uniformly profiled control groove 32**.

One of the simplest meridian systems which has been found satisfactory with respect to the required machining accuracy is produced by the formation of three double-meridian systems whose axes are perpendicular to one another, as shown in FIG. 9. The cycle 48 (FIG. 7) is terminated or closed after three passages of the ball 30 through the polycomplex 47. Each polycomplex 47 consists of two complexes **46, 46*a*. When the ball 30 passes through the sequence 44 of the first complex 46, half the required number of meridians is produced, and by the passage of the ball 30 through the further sequence 44*a* of the second complex 46*a*** one and a half times the required number of meridians is produced.

This will be explained on hand of the following example: Assuming that for the machining operation a nominal number of twenty meridians is chosen, these 20 meridians correspond to 10 full circles. However, the nominal number of meridians need not correspond to the actual number of meridians. These two values may differ according to the chosen program. In the case under consideration, illustrated in FIG. 9, the nominal number of meridians equals 20, but the actual number is 40 and denotes always the number of meridians in one axis. During passage of the ball 30 through the sequence 44 of the first complex 46, half the number of meridians, i.e. 10 meridians, are formed and during passage of the ball 30 through the next sequence **44*a* of the second complex 46*a***, one and a half the number of the required meridians, i.e. 30 meridians are produced.

Figure 10A:
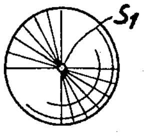
Figure 10B:
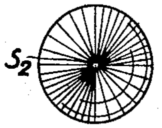
Figure 10C:
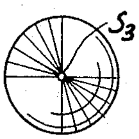
Figure 10D:
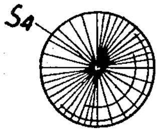
Figure 10E:
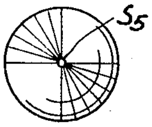
Figure 10F:
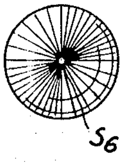

The meridians produced by the ball 30 passing through the first sequence 44 have a north pole, marked $S_1$ in FIG. 9. The number of waves 38 in this sequence 44 is chosen so that the first meridian 60 should form with the last meridian 61 an angle of 90°. After the ball 30 has passed through the dwell 45 in the direction of the arrow A (FIG. 9) and thus through the first complex 46, the formation of the next meridian system is initiated, the number of meridians amounting to one and a half times said number, the axis 63 of this meridian system being perpendicular to the axis 64 of the preceding meridian system. The north pole of this further meridian system is marked $S_2$. Its formation will be apparent from FIG. 10*b*. The number of waves 38 is again chosen so that the last meridian 65 of this further meridian system produced by the passage of the ball 30 through the sequence 44 should be perpendicular to the first meridian 66 of this further system and form an angle of 270° therewith. After passing through the dwell 45*a*, the passage of the ball 30 through the second complex 46*a* and simultaneously the first passage through the polycomplex 47 are terminated. The further passage of the ball 30 through this polycomplex 47 proceeds in an analogous way. The formation of a meridian system with a north pole $S_3$ by the second passage of the ball 30 through the first sequence 44 of the polycomplex 47 will be apparent from FIG. 10*c*, and the meridian system with a north pole $S_4$ produced by the second passage of the ball 30 through the further sequence 44*a* of the polycomplex 47 will be seen in FIG. 10*d*. After the third passage of the ball 30 through the polycomplex 47, the working cycle 48 is complete or closed.

The meridian systems produced on the ball 30 during this third passage through the polycomplex 47 have their north pole $S_5$ formed by the passage of the ball through the first sequence 44 and a north pole $S_6$ produced by the passage of the ball 30 through the further sequence 44*a*. These poles with the corresponding meridians can be seen in FIGS. 10*e* and 10*f*. For the sake of clarity, FIGS. 10*a* to 10*f* illustrate just that meridian system which is produced by the passage of the ball through the respective sequence 44 or 44*a*. In fact, each meridian system produces a complement to its opposite system, which means that the meridian systems with poles $S_1$ and $S_4$, $S_2$ and $S_5$, and finally $S_3$ and $S_6$ form complements, with the result that double meridian systems are produced which cover the entire ball 30 with a uniformly dense network of meridians, as is apparent from FIG. 11.

Figure 13A:
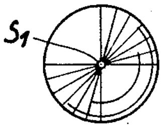
Figure 13B:
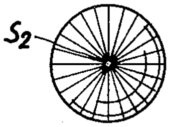

A similar effect, i.e. the covering of the ball with a uniform network of meridians, may also be achieved in another way, for instance, when effecting the working cycle 48 by a fourfold passage of the ball 30 through the polycomplex 47, as illustrated in FIG. 12. The polycomplex 47 consists again of two complexes 46, 46*a*. By the ball 30 passing through the first sequence 44 of the first complex 46, half the number of meridians is always produced while the next sequence 44*a* of the second complex 46*a* produces the full number of meridians. In the course of the passage of the ball 30 through the first sequence 44 a part of the meridian system is formed, containing half the number of meridians with the north pole $S_1$ (FIG. 13*a*). The number of waves is chosen so that the last meridian of the sequence 44 should form an angle of 90° with the first meridian of the sequence 44. After the ball 30 has passed the dwell 45 and thus the complex 46, the formation of the next meridian system is initiated, having the full number of meridians and an axis perpendicular to the preceding meridian system. This further meridian system with a north pole $S_2$ is produced in the manner illustrated in FIG. 13*b*. The number of waves 38 is chosen so that the last meridian of this further sequence 44*a* is parallel with the first meridian, i.e. forms an angle of 180° therewith. In this position, the passage of the ball 30 through the second complex 46*a* is completed. The further meridian system or their parts are produced in an analogous manner by further passages of the ball 30 through the polycomplex 47.

Figure 13C:
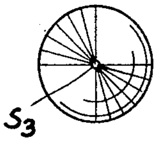
Figure 13D:
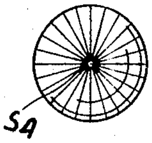
Figure 13E:
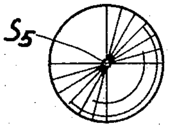
Figure 13F:
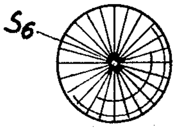
Figure 13G:
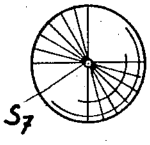
Figure 13H:
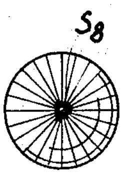

The formation of the meridian system with the north pole $S_3$ will be apparent from FIG. 13*c*. The formation of the meridian system with the north pole $S_4$ produced by the second passage of the ball 30 through the further sequence 44*a* of the polycomplex 47 is shown in FIG. 13*d*; of the meridian system with the north pole $S_5$ after the third passage of the ball 30 through the first sequence 44 of the polycomplex 47 is illustrated in FIG. 13*e*; of the meridian system with the north pole $S_6$ after the third passage through the further sequence 44*a* of the polycomplex 47 is represented in FIG. 13*f*, and, finally, after the fourth passage through the polycomplex 47 the entire operational cycle 48 is complete or closed. Meridian systems produced during the fourth passage of the ball 30 through this polycomplex 47 have their north poles $S_7$ and $S_8$ and are illustrated in FIGS. 13*g* and 13*h*. For clarity's sake, FIGS. 13*a* to 13*h* represent always just that meridian system which is formed by the passage of the ball through the respective sequence. In fact, each meridian system produces a complement to the opposite system, which means that the meridian systems are complemented in such a way as to produce double meridian systems with three axes perpendicular to one another, in a manner similar to the preceding example. The result, i.e. a uniform coverage of the ball with a uniformly dense network of meridians, is the same as in the previous example shown in FIG. 11.

The phase shift achieved by the dwell 45 can be replaced by the formation of a pole cap, in which case the meridians do not intersect one another in one point. This may be achieved when during the passage of the ball 30 through the first sequence 44 the transmission ratio exceeds $n$:1. It is, however, essential that after passage of the ball 30 through one polycomplex 47 the mean ratio should be $n$:1 or at least closely approach same.

The control groove 32 may be provided either on the fixed disk 4 or on the rotatable disk 6 or, if required, on both disks.

By a suitable combination of complexes 46, 46*a*, polycomplexes 47 can be formed having an action by which any required arrangement of meridian systems can be obtained on the ball after conclusion of the working cycle.

In the above disclosure the contact of the ball with the control groove has been shown as being constituted by a continuous circular arc. While it is advantageous that the ball should contact the groove or the disk along an arc, another alternative arrangement may be used in which the contact occurs at spaced points. The angle formed by the connecting line of these points with the plane of the disks is subject to a positive change in the same way as the axis of rotation 37 disclosed in the preceding examples, as will be readily apparent to those skilled in the art.

This may be achieved by a roof-shaped or converging arrangement of the control surface (groove).

My new method and apparatus may be employed wherever the surface of a spherical body is required to pass positively under a working point, i.e. not only in the course of grinding, polishing and lapping, but also cleaning and the like operations.

The apparatus embodying the invention can be used with advantage in connection with the majority of existing machines for the manufacture of balls for antifriction bearings by a relatively simple substitution for the working disks used in conventional machines.

I claim:

1. A method of treating the surface of a spherical body, comprising the steps of:

(a) rolling the spherical body between working surfaces, of which at least one constitutes simultaneously a control surface, (b) positively displacing rolling points between the spherical body and the working surface with respect to an axis of the spherical body perpendicular to the working surfaces, to produce a system of meridians substantially intersecting one another in poles, and repeating said steps after (c) interrupting the positive displacement of rolling points by a dwell, after a given meridian system has been produced, to effect a phase shift by said dwell, and to determine the angular spacing of a previously formed pole from a pole formed after the dwell.

2. A method as in claim 1, wherein the spherical body contacts the working surfaces along a continuous arc.

3. A method as in claim 1, wherein the spherical body contacts the working surfaces in spaced points.

4. A method as in claim 1, wherein the control surface is of wavy formation, the length of one wave depending on the number $n$ of revolutions of the spherical body, wherein $n$ is an integer number.

5. A method as in claim 1, wherein the control surface is of wavy formation, and the ratio of the number of waves in various wave sequences to the number of revolutions of the spherical body represents an integer number.

6. A method as in claim 1, wherein the control surface is of wavy formation, the waves proceeding along a sine curve.

7. A method as in claim 1, wherein the control surface is of zig-zag formation.

8. An apparatus for precision treatment of the surfaces of spherical bodies, comprising, in combination, (a) two working disks, at least one of which is rotatable, (b) a control surface in at least one of said disks, the longitudinal profile of said control surface being of wavy formation, wherein consecutive waves form a wave sequence, and (c) dwells in the control surface separating consecutive wave sequences from one another.

9. An apparatus as in claim 8, wherein a control surface for performing a closed working cycle comprises systems of wave sequences and dwells, at least one wave sequence and one dwell forming a complex and at least two complexes forming a polycomplex, a closed working cycle comprising at least one complex.

10. An apparatus as in claim 8, wherein the waves whose sequence forms a part of the longitudinal profile of the control surface, are shaped so that the length of each wave provides a full revolution of a spherical body of a given diameter around its axis of rotation, in order to provide a transmission ratio of 1:1.

11. An apparatus as in claim 8, wherein the waves, whose sequence forms a part of the longitudinal profile of the control surface, have a length at each wave providing a full number of revolutions of a spherical body of a given diameter around its axis of rotation, in order to provide a transmission ratio of $n$:1.

12. An apparatus as in claim 8, wherein the waves whose sequence forms a part of the longitudinal profile of the control surface have different lengths, the total length of the waves forming a wave sequence providing a full number of revolutions of a spherical body of a given diameter around its axis of rotation, in order to provide a transmission ratio $n$:1 for a complex consisting of a wave sequence and a dwell.

13. An apparatus as in claim 8, wherein the waves whose sequence forms part of the longitudinal profile of the control surface have different lengths, the total length of the waves forming wave sequences in two complexes providing a full number of revolutions of a spherical body of a given diameter around its axis of rotation, in order to provide a transmission radio $n$:1 of a polycomplex.

14. An apparatus as in claim 8, wherein the longitudinal profile of the control surface is of zig-zag formation.

References Cited

UNITED STATES PATENTS

| | | | |
|---|---|---|---|
| 463,418 | 11/1891 | Dyke | 51—130 |
| 868,860 | 10/1907 | Hoffmann | 51—289 |
| 2,964,886 | 12/1960 | Messerschmidt | 51—130 |
| 3,133,382 | 5/1964 | Messerschmidt | 51—289X |
| 2,335,294 | 11/1943 | Meyer | 51—389X |

THERON E. CONDON, Primary Examiner

R. L. SPRUILL, Assistant Examiner

U.S. Cl. X.R.

51—130, 289